(12) United States Patent
Liu

(10) Patent No.: US 12,078,248 B2
(45) Date of Patent: Sep. 3, 2024

(54) SEALING MEMBER AND TOILET FLANGE ASSEMBLY

(71) Applicant: Xiamen Horing Sanitary Co, Ltd., Fujian (CN)

(72) Inventor: Rongqing Liu, Xiamen (CN)

( * ) Notice: Subject to any disclaimer, the term of this patent is extended or adjusted under 35 U.S.C. 154(b) by 98 days.

(21) Appl. No.: 17/875,417

(22) Filed: Jul. 28, 2022

(65) Prior Publication Data

US 2024/0035571 A1 Feb. 1, 2024

(51) Int. Cl.
*F16J 15/02* (2006.01)
*E03D 11/16* (2006.01)

(52) U.S. Cl.
CPC ............ *F16J 15/022* (2013.01); *E03D 11/16* (2013.01)

(58) Field of Classification Search
CPC .......... E03D 11/16; F16J 15/022; F16L 19/02
See application file for complete search history.

(56) References Cited

U.S. PATENT DOCUMENTS 5,185,890 A * 2/1993 Dismore ................. E03D 11/16
4/252.5
11,274,429 B2 * 3/2022 Schuster .................... F16L 5/10

FOREIGN PATENT DOCUMENTS

CN 1777723 A * 5/2006 ............ E03D 11/16
CN 104314157 A * 1/2015 ............ E03D 11/16

* cited by examiner

*Primary Examiner* — Erin Deery

(57) ABSTRACT

A sealing member and a toilet flange assembly are disclosed. The sealing member is made of an elastic material, and includes an upper ring portion, a connecting ring portion and a lower ring portion that are connected in sequence from top to bottom. The upper ring portion is fitted on a flange member. Upper and lower ends of the connecting ring portion are connected to the upper ring portion and the lower ring portion, respectively. An inner wall of the connecting ring portion is connected with a toilet drain pipe. The lower ring portion has a diameter less than that of the upper ring portion. An outer wall of the lower ring portion is connected with a ground drain pipe. The toilet flange assembly can solve the problem of fitting between toilet drain pipes of different diameters and ground drain pipes.

16 Claims, 8 Drawing Sheets

SEALING MEMBER AND TOILET FLANGE ASSEMBLY

BACKGROUND OF THE INVENTION

1. Field of the Invention

The present invention relates to plumbing fittings, and more particularly to a sealing member with good adaptability and a toilet flange assembly using the sealing member.

2. Description of the Prior Art

The installation process of a traditional toilet is as follows: a ground drain pipe is preset in the ground of the bathroom, the toilet drain pipe is connected to the ground drain pipe, the toilet drain pipe and the ground drain pipe are connected through a toilet flange, and the joint between the toilet drain pipe and the ground drain pipe is sealed with a bonding material, such as grease, mastic, and wax rings.

In actual use, due to changes in building construction standards, the dimension of ground drain pipes in some old buildings is relatively small. The dimensions of the existing toilet drain pipes are designed according to the current building construction standards, resulting in the incompatibility of the toilet drain pipes on the market with the ground drain pipes of old buildings. The use of existing toilet flange cannot solve the problem of sealing between the toilet drain pipe and the ground drain pipe. However, the modification of ground drain pipes in old buildings is difficult, the amount of work to be done is large, and the cost is high, so it is not a good solution. Besides, the sealing effect of bonding materials, such as grease, mastic, and wax rings, is not ideal. The bonding material is hard when cold and soft when hot, which makes its sealing effect easily affected by the ambient temperature and drain water temperature. In general, bonding materials are individually packaged and transported. It is necessary to use release paper on the outer layer of the bonding material for separation. In use, the release paper needs to be removed and then fitted with the toilet flange. The packaging process and installation operations are more complex and costly.

SUMMARY OF THE INVENTION

The primary object of the present invention is to provide a sealing member and a toilet flange member, which can solve the problem of fitting between toilet drain pipes of different diameters and ground drain pipes, providing a stable and efficient sealing effect.

In order to achieve the above object, the present invention adopts the following technical solutions:

According to one aspect of the present invention, a sealing member is provided. The sealing member is made of an elastic material. The sealing member comprises an upper ring portion, a connecting ring portion and a lower ring portion that are connected in sequence from top to bottom. The upper ring portion is configured to assemble the sealing member to a flange member. Upper and lower ends of the connecting ring portion are respectively connected to the upper ring portion and the lower ring portion to form a drain channel. An inner wall of the connecting ring portion is connected with a toilet drain pipe. The lower ring portion has a diameter less than that of the upper ring portion. An outer wall of the lower ring portion is connected with a ground drain pipe.

Preferably, the elastic material is a thermoplastic elastomer having a Shore hardness of 50A.

Preferably, the connecting ring portion has an annular curved side wall. Alternatively, the connecting ring portion has an inverted truncated cone shape.

Preferably, the inner wall of the connecting ring portion is recessed to form a V-shaped groove.

Preferably, a cross-section of the V-shaped groove is a triangle, and two angles of the triangle are located on the inner wall of the connecting ring portion.

According to another aspect of the present invention, a toilet flange assembly is provided. The toilet flange assembly comprises the foregoing sealing member and a flange member. The upper ring portion of the sealing member is axially restricted and fitted in the flange member.

Preferably, the toilet flange assembly further comprises a sealing ring made of an elastic material. The sealing ring is fitted to a lower surface of the flange member.

Preferably, the elastic material is a thermoplastic elastomer having a Shore hardness of 50A.

Preferably, the sealing ring is detachably connected to the lower surface of the flange member. Alternatively, the sealing ring is integrally formed with the lower surface of the flange member through a mold.

When the sealing ring is detachably connected to the flange member, an inner edge of an upper surface of the sealing ring protrudes outward to form an annular boss. The lower surface of the flange member is recessed to form an annular groove. The annular boss is engaged in the annular groove.

When the sealing ring is detachably connected to the flange member, an upper surface of the sealing ring has a plurality of protruding posts. A peripheral surface of an end portion of each protruding post has a receiving groove. The flange member has mounting holes corresponding in position to the protruding posts. A side wall of each mounting hole is engaged in the corresponding receiving groove.

Preferably, the upper ring portion has an annular flange extending radially and outwardly. An inner edge of an upper surface of the flange member is recessed to form an annular step. The annular flange is fitted on the step. Alternatively, the sealing ring is integrally formed with the flange member through a mold.

When the sealing ring is detachably connected to the flange member, an edge of the annular flange has a plurality of buckles, and a side wall of the step has buckle holes for the buckles to be connected with the buckle holes in a snap-fit manner Preferably, the sealing member is integrally formed with the sealing ring through a mold.

After adopting the above-mentioned technical solutions, the present invention has the following technical effects:

1. In the present invention, the inner wall of the connecting ring portion of the sealing member is connected with the toilet drain pipe, and the outer wall of the lower ring portion of the sealing member is connected with the ground drain pipe. In assembly, after the toilet drain pipe is connected to the ground drain pipe, the ground drain pipe will push up the lower half of the connecting ring portion to be deformed. Under the action of the elastic material, the deformed portion of the connecting ring portion will be tightly connected to the joint of the toilet drain pipe and the ground drain pipe. Even if the diameter of the ground drain pipe is less than the diameter of the toilet drain pipe, the toilet flange assembly provides a good sealing effect.

2. Compared with the existing sealing method using the bonding material, the sealing member is not easily affected by the ambient temperature and the drain water temperature, and the sealing performance is good and efficient.

DETAILED DESCRIPTION OF THE PREFERRED EMBODIMENTS

Figure 1:
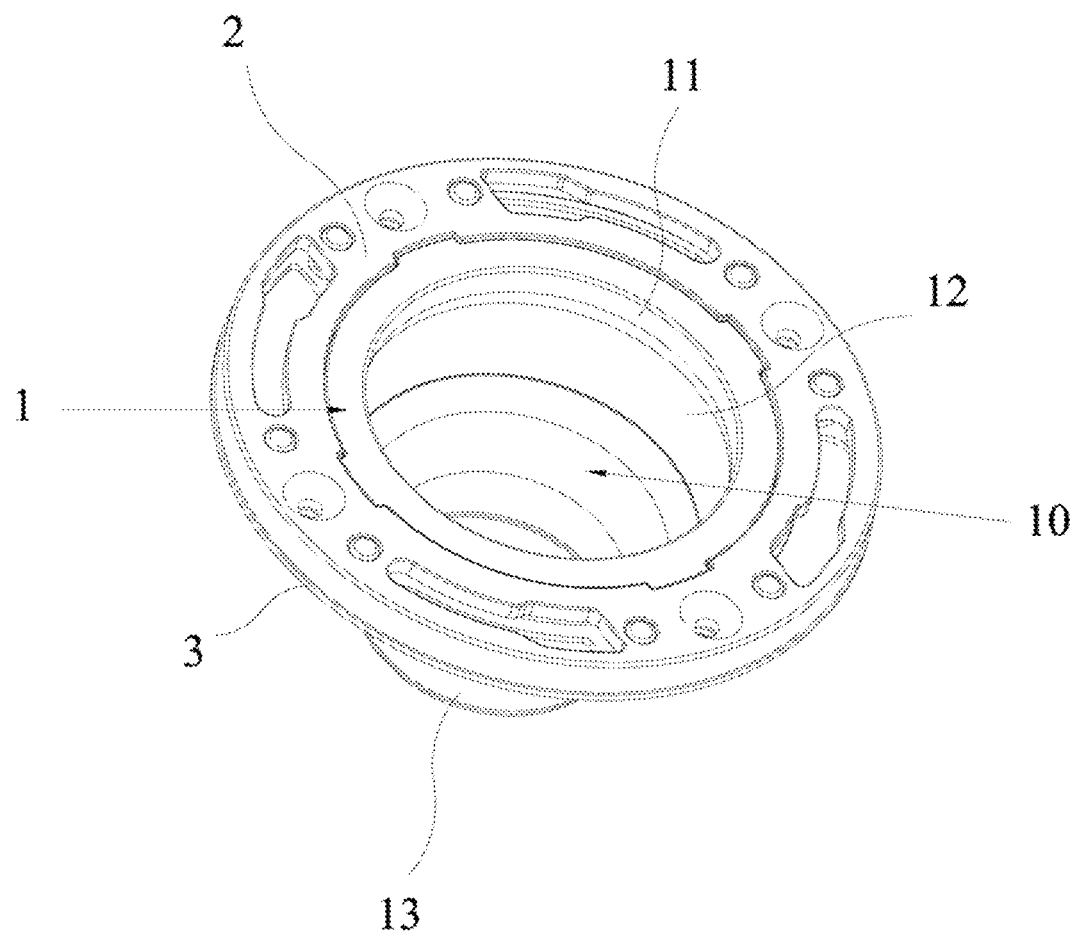
FIG. 1 is a first perspective view according to an embodiment of the present invention.
Figure 2:
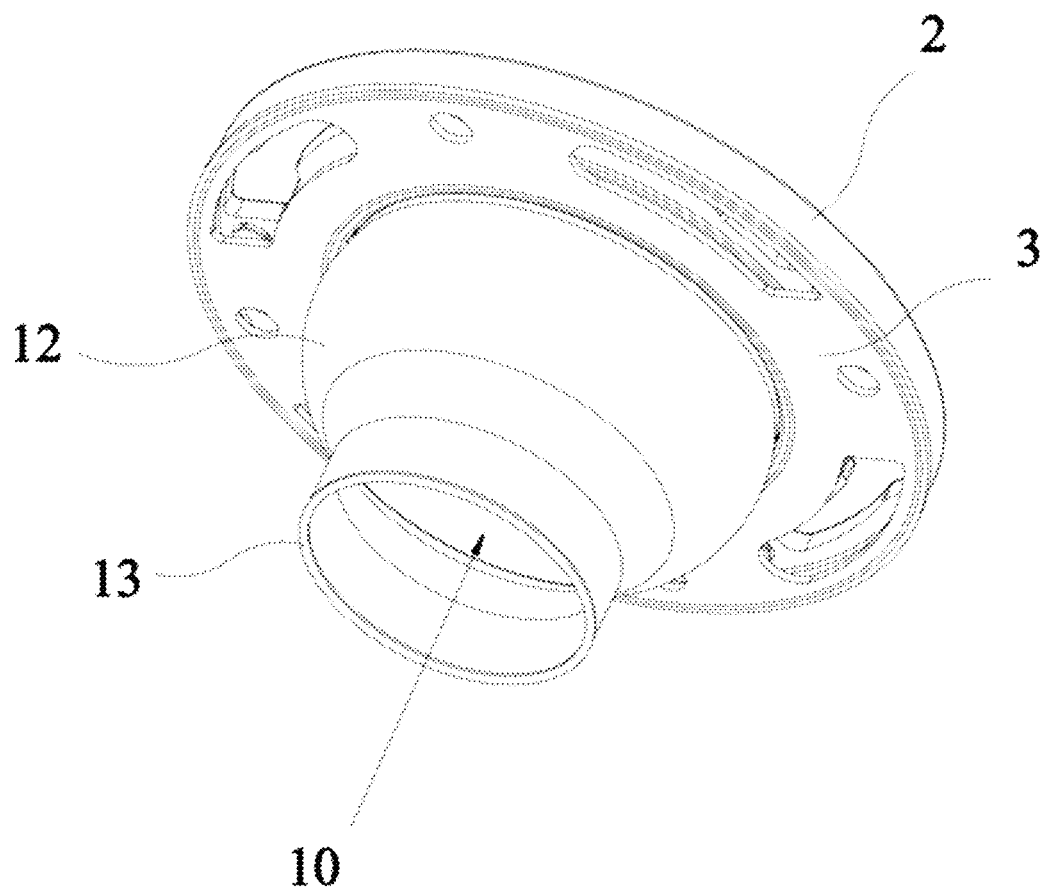
FIG. 2 is a second perspective view according to the embodiment of the present invention.
Figure 3:
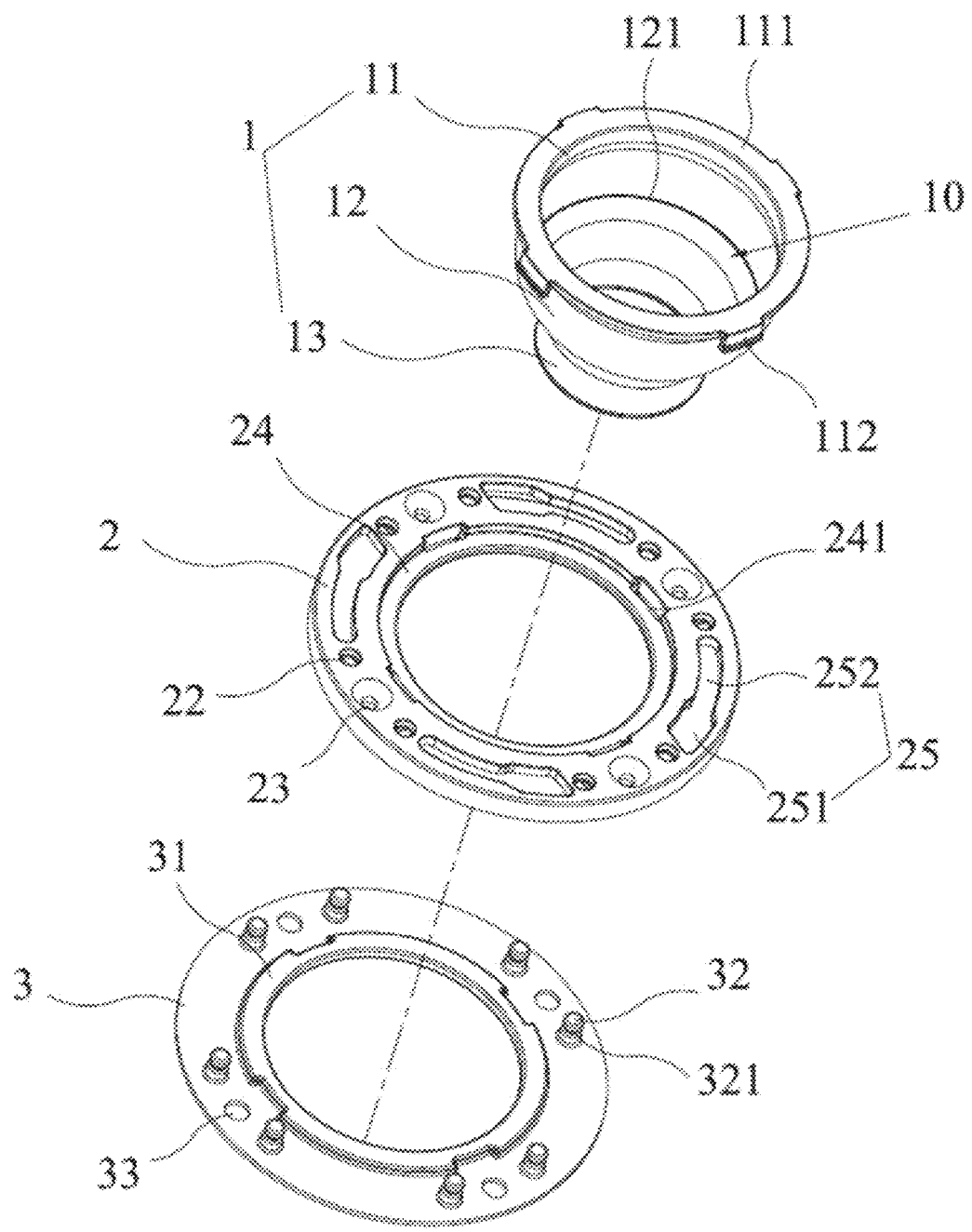
FIG. 3 is a first exploded view according to the embodiment of the present invention.
Figure 4:
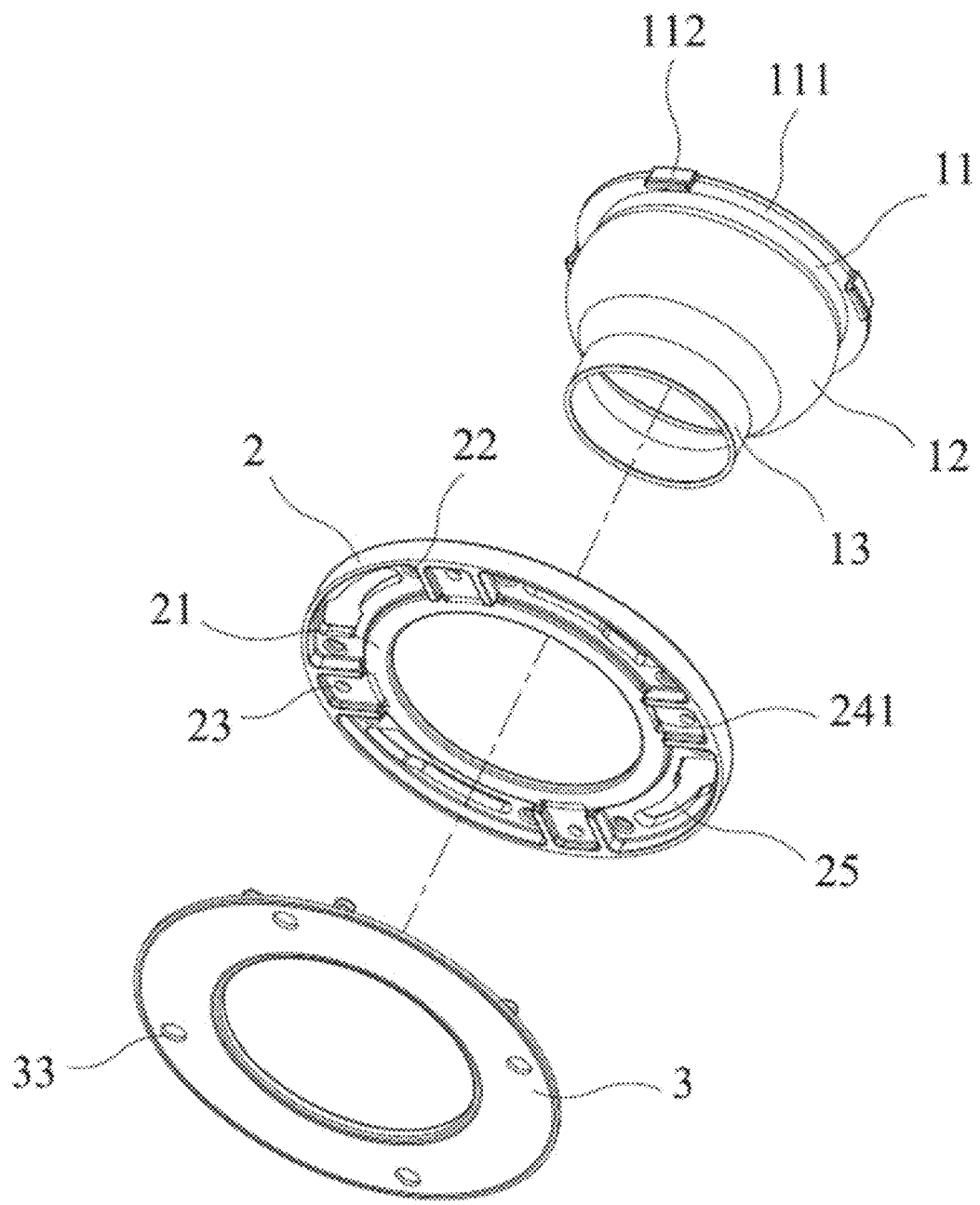
FIG. 4 is a second exploded view according to the embodiment of the present invention.
Figure 5:
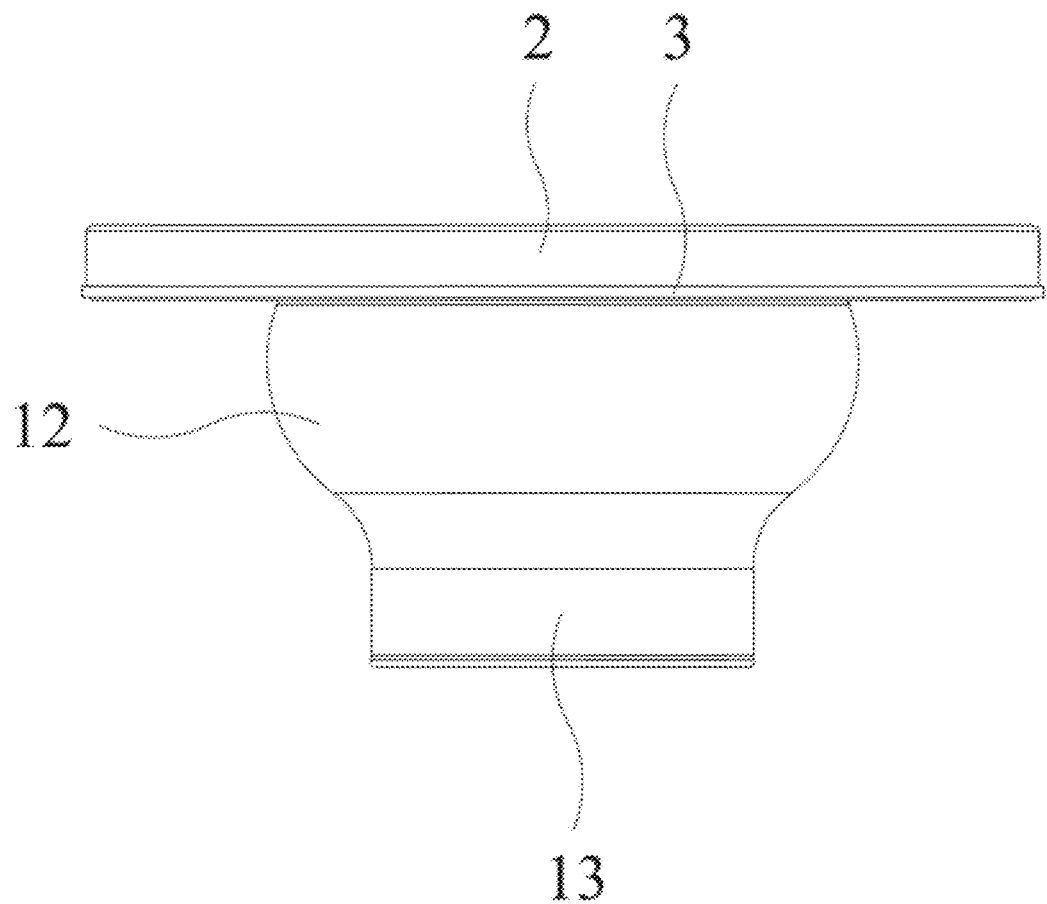
FIG. 5 is a front view according to the embodiment of the present invention.
Figure 6:
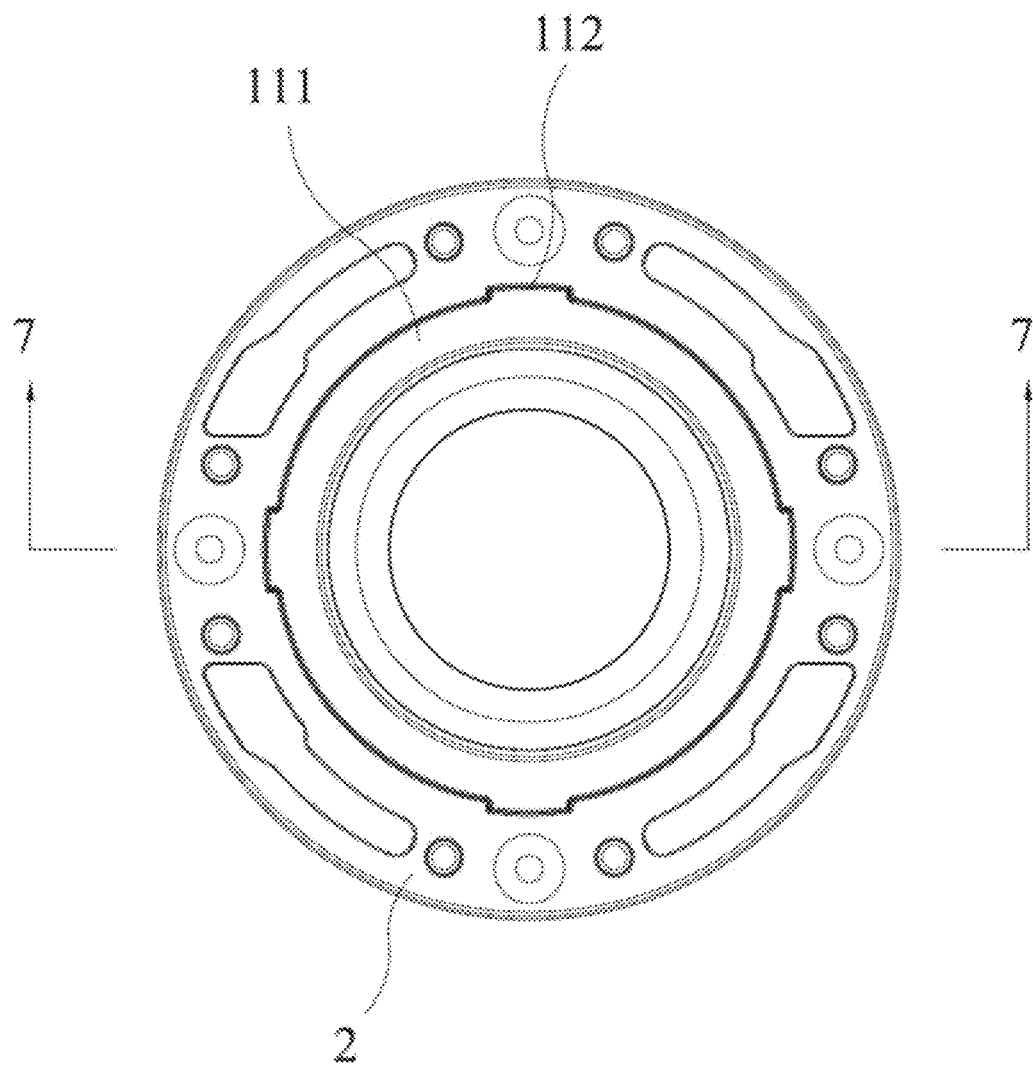
FIG. 6 is a top view according to the embodiment of the present invention.
Figure 7:
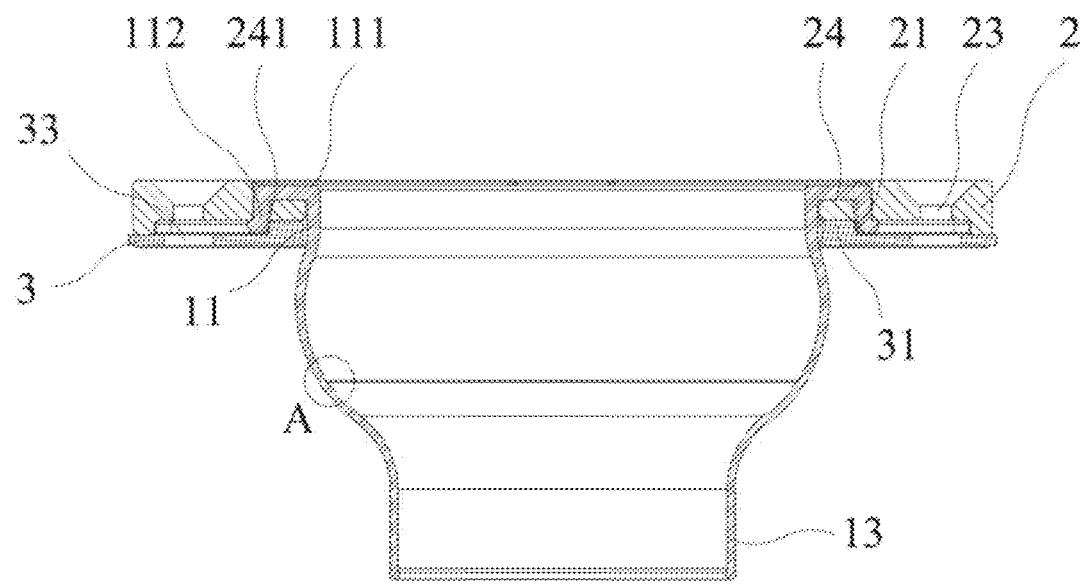
FIG. 7 is a cross-sectional view taken along line 7-7 of FIG. 6.
Figure 7A:
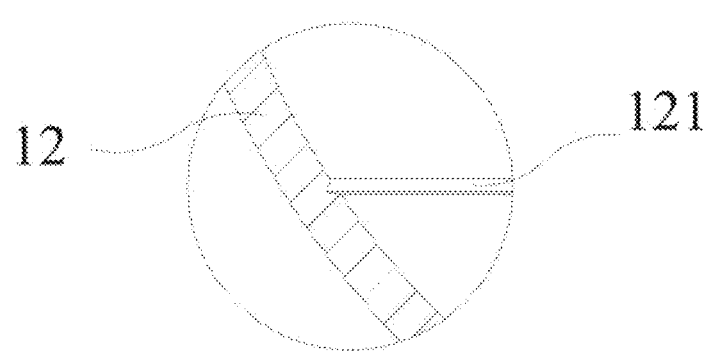
FIG. 7A is an enlarged view of circle A of FIG. 7.

Referring to FIGS. 1 to 7, the present invention discloses a sealing member 1 and a toilet flange assembly using the sealing member 1. The sealing member 1 and the toilet flange assembly are described below, respectively.

The present invention discloses a sealing member 1. The sealing member 1 is made of an elastic material, and includes an upper ring portion 11, a connecting ring portion 12 and a lower ring portion 13 that are connected in sequence from top to bottom.

The upper ring portion 11 is configured to assemble the sealing member 1 to a flange member 2.

The upper and lower ends of the connecting ring portion 12 are respectively connected to the upper ring portion 11 and the lower ring portion 13 to form a drain channel 10. The inner wall of the connecting ring portion 12 is connected with a toilet drain pipe a.

The diameter of the lower ring portion 13 is less than the diameter of the upper ring portion 11, so that a reduced opening is formed at the lower end of the connecting ring portion 12. The outer wall of the lower ring portion 13 is connected with a ground drain pipe b.

In some embodiments of the sealing member 1, the elastic material is a thermoplastic elastomer having a Shore hardness of 50A.

In some embodiments of the sealing member 1, the connecting ring portion 12 has an annular curved side wall. The lower end of the connecting ring portion 12 has a reduced opening, which is beneficial to be connected with the lower ring portion 13. The side wall of the connecting ring portion 12 is an annular curved side wall, so that a bonding material 4 can be applied to the inner wall of the connecting ring portion 12 in actual use. After the toilet is installed, the bonding material 4 will be filled between the end of the toilet drain pipe a and the inner wall of the connecting ring portion 12, so as to improve the sealing performance. Of course, the connecting ring portion 12 may be designed to have an inverted truncated cone shape (that is, the inverted truncated cone has a large upper segment and a small lower segment), so as to meet the design of the reduced opening of the connecting ring portion 12

Further, the inner wall of the connecting ring portion 12 is recessed-to form a V-shaped groove 121. In actual use, the toilet drain pipe a is connected to the ground drain pipe b, the lower half of the connecting ring portion 12 is pressed by the ground drain pipe b and deformed upward toward the inside of the connecting ring portion 12. In other words, a lower half of the connecting ring portion 12 is deformable to bend upward towards inside of the connecting ring portion 12 to form a V-shaped recess 122 inside the connecting ring portion 12 for receiving therewithin a lower end of the toilet drain pipe a and an inverted V-shaped recess 123 outside the connecting ring portion 12 for receiving an upper end of the ground drain pipe b therewithin. By providing the V-shaped groove 121, the deformation of the connecting ring portion 12 becomes easier and has a guide property. In this embodiment, the cross-section of the V-shaped groove 121 is a triangle, and two angles of the triangle are located on the inner wall of the connecting ring portion 12. That is, the inner wall of the connecting ring portion 12 forms a triangular notch as the V-shaped groove 121, so that the connecting ring portion 12 is easily deformed in a predetermined direction by the pressing of the ground drain pipe b.

In some embodiments of the sealing member 1, the upper ring portion 11 has an annular flange 111 extending radially and outwardly. The annular flange 111 cooperates with the flange member 2 to realize the restriction in the axial direction of the connecting ring portion 12, so as to prevent the sealing member 1 from being pulled off from the flange member 2 after the toilet drain pipe a is inserted to the inner wall of the connecting ring portion 12. Through the restriction action of the annular flange 111 and the elasticity of the sealing member 1, when the toilet drain pipe a exerts a downward pulling force on the sealing member 1, the upper segment of the connecting ring portion 12 is deformed to be close to the end of the toilet drain pipe a, so as to improve the sealing performance between the sealing member 1 and the toilet drain pipe a.

Further, the edge of the annular flange 111 has a plurality of buckles 112. The buckles 112 are detachably connected to the flange member 2 to further improve the firmness of the sealing member 1 after being assembled with the flange member 2. The buckles 112 may be replaced with a detachable matching structure.

The present invention further discloses a toilet flange assembly, comprising the above-mentioned sealing member 1 and a flange member 2. The upper ring portion 11 of the sealing member 1 is axially restricted and fitted in the flange member 2.

In this embodiment, the flange member 2 is made of ABS (Acrylonitrile Butadiene Styrene).

In some embodiments of the toilet flange assembly, the toilet flange assembly further comprises a sealing ring 3 made of an elastic material. The sealing ring 3 is fitted to the lower surface of the flange member 2. The sealing member 1 can solve the problems of compatibility and sealability between the toilet drain pipe a and the ground drain pipe b. The sealing ring 3 can solve the problem of sealability between the flange member 2 and the ground. Since the sealing ring 3 is made of an elastic material, after the toilet flange assembly is installed, the weight of the ceramic body of the toilet will make the flange member 2 press down on the sealing ring 3, so that the sealing ring 3 is tightly connected between the flange member 2 and the ground. Even if there is accidental leakage at the joint of the two drain pipes, the sewage will not leak from the gap between the flange member 2 and the ground. Besides, the sealing ring 3 plays a buffering role between the flange member 2 and the ground and avoids rigid contact between the flange member 2 and the ground when the flange member 2 is locked on the ground.

Further, the elastic material is a thermoplastic elastomer having a Shore hardness of 50A.

The sealing ring 3 is detachably connected to the lower surface of the flange member 2. Because the flange member 2 and the sealing ring 3 are made of different materials, the two are designed to be detachably connected to facilitate assembly. In this embodiment, the inner edge of the upper surface of the sealing ring 3 protrudes outward to form an annular boss 31. The lower surface of the flange member 2 is recessed to form an annular groove 21. The annular boss 31 is engaged in the annular groove 21 so as to realize the fitting between the sealing ring 3 and the flange member 2. The upper surface of the sealing ring 3 has a plurality of protruding posts 32. The peripheral surface of the end portion of the protruding post 32 has a receiving move 321. The flange member 2 has mounting holes 22 corresponding in position to the protruding posts 32. The side wall of the mounting hole 22 is engaged in the receiving groove 321 to realize the detachable connection between the sealing ring 3 and the flange member 2, The protruding posts 32 are evenly arranged to improve the force balance between the flange member 2 and the sealing ring 3 and to achieve randomness in assembly, There is no specific installation direction.

In some embodiments of the toilet flange assembly, the flange member 2 has a plurality of locking holes 23 for insertion of bolts to lock the flange member 2 on the pound. When the sealing ring 3 is provided, the sealing ring 3 has through holes 33 corresponding to the locking holes 23, so that the bolts can pass through the sealing ring 3 to be locked to the ground.

In some embodiments of the toilet flange member, the inner edge of the upper surface of the flange member 2 is recessed to form an annular step 24. The step 24 is matched with the annular flange 111, so as to realize the axial restriction of the sealing member 1 after the sealing member 1 is assembled with the flange member 2.

Further, the side wall of the step 24 has buckle holes 241 for the buckles 112 to be connected with the buckle holes 241 in a snap-fit manner.

In some embodiments of the toilet flange assembly, the flange member 2 has a plurality of arc-shaped guide grooves 25 for bolts to be movably fitted in the arc-shaped guide grooves 25, so as to achieve locking between the flange member 2 and the toilet (ceramic body). The arc-shaped guide groove 25 is configured to receive and position the bolt. The head portion of the bolt faces downward, and the thread portion of the bolt faces upward.

Further, the arc-shaped guide groove 25 includes a wide groove portion 251 and a narrow groove portion 252 communicating with the wide groove portion 251. In assembly, after the bolt is turned upside down, the head portion of the bolt is inserted downward into the wide groove portion 251 and is moved toward and positioned at the narrow groove portion 252.

The sealing member 1 and the sealing ring 3 may be integrally formed with the flange member 2 through a mold to form an integral structure. Alternatively, the sealing member 1 and the sealing ring 3 may be formed into an integral structure and then assembled to the flange member 2. For example, the sealing ring 3 is directly formed on the outer wall of the upper half of the connecting ring portion 12.

Figure 8:
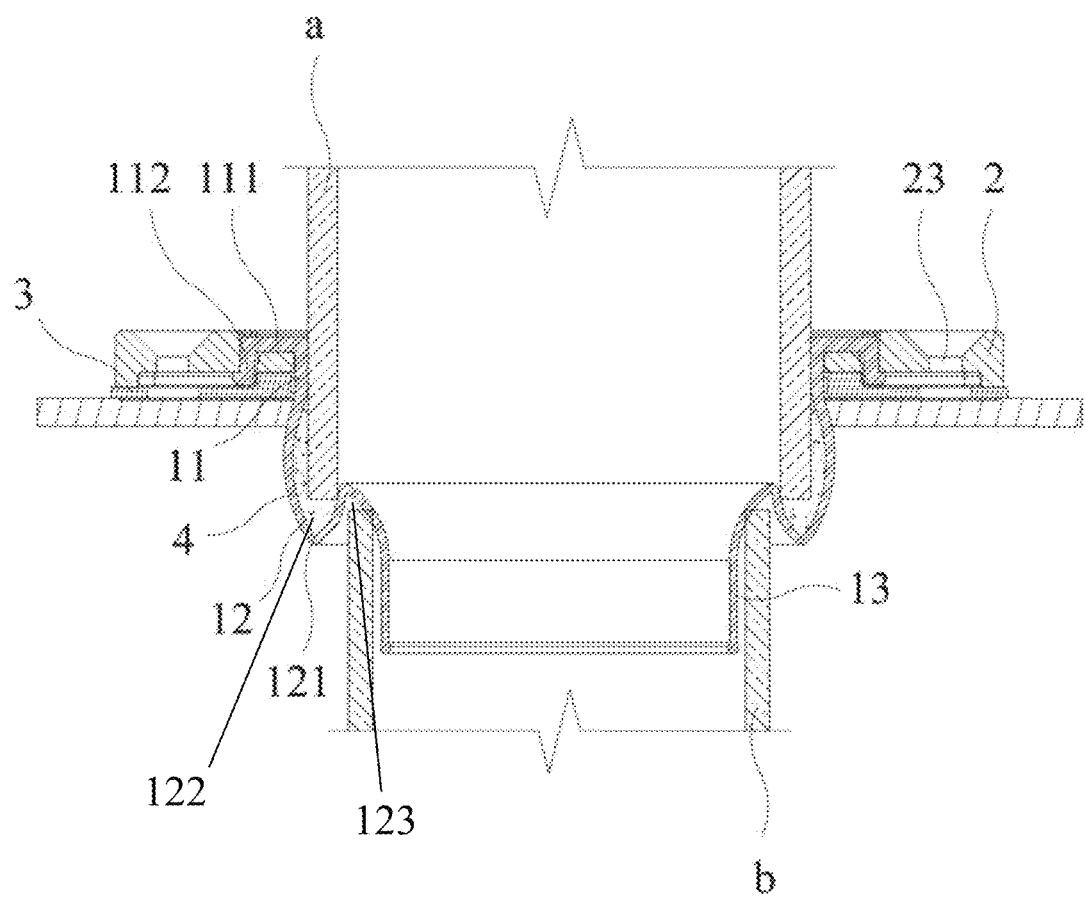
FIG. 8 is a schematic view according to the embodiment of the present invention when in use.

Referring to FIG. 8, the working principle of the present invention is described below.

In the present invention, through the sealing member 1 having a large upper segment and a small lower segment, the inner wall of the connecting ring portion 12 of the sealing member 1 is connected with the toilet drain pipe a, and the outer wall of the lower ring portion 13 of the sealing member 1 is connected with the ground drain pipe b. In assembly, after the toilet drain pipe a is connected to the ground drain pipe b, the ground drain pipe b will push up the lower half of the connecting ring portion 12 to be deformed. Under the action of the elastic material, the deformed portion of the connecting ring portion 12 will be tightly connected to the joint of the toilet drain pipe a and the ground drain pipe b. Even if the diameter of the ground drain pipe b is less than the diameter of the toilet drain pipe a (in fact, the gap between the two is not large), the toilet flange assembly can provide a good sealing effect. Compared with the existing sealing method using the bonding material 4, the sealing member 1 is not easily affected by the ambient temperature and the drain water temperature, and the sealing performance is good and efficient.

What is claimed is:

1. A sealing member, the sealing member being made of an elastic material and comprising an upper ring portion, a connecting ring portion and a lower ring portion that are connected in sequence from top to bottom;
   the upper ring portion being configured to assemble the sealing member to a flange member;
   upper and lower ends of the connecting ring portion being respectively connected to the upper ring portion and the lower ring portion to form a drain channel, an inner wall of the connecting ring portion being connected with a toilet drain pipe;
   the lower ring portion having a diameter less than that of the upper ring portion, an outer wall of the lower ring portion being connected with a ground drain pipe;
   when the toilet drain pipe is connected to the ground drain pipe, a lower half of the connecting ring portion is deformable to bend upward towards inside of the connecting ring portion to form a V-shaped recess inside the connecting ring portion for receiving therewithin a lower end of the toilet drain pipe and an inverted V-shaped recess outside the connecting ring portion for receiving an upper end of the ground drain pipe therewithin.

2. The sealing member as claimed in claim 1, wherein the elastic material is a thermoplastic elastomer having a Shore hardness of 50A.

3. The sealing member as claimed in claim 1, wherein the connecting ring portion has an annular curved side wall.

4. The sealing member as claimed in claim 1, wherein the connecting ring portion has an inverted truncated cone shape.

5. A toilet flange assembly, comprising the sealing member as claimed in claim 1 and a flange member; the upper ring portion of the sealing member being axially restricted and fitted in the flange member.

6. The toilet flange assembly as claimed in claim 5, further comprising a sealing ring made of an elastic material; the sealing ring being fitted to a lower surface of the flange member.

7. The toilet flange assembly as claimed in claim 6, wherein the elastic material is a thermoplastic elastomer having a Shore hardness of 50A.

8. The toilet flange assembly as claimed in claim 6, wherein the sealing ring is detachably connected to the lower surface of the flange member.

9. The toilet flange assembly as claimed in claim 8, wherein an inner edge of an upper surface of the sealing ring protrudes outward to form an annular boss, the lower surface of the flange member is recessed to form an annular groove, and the annular boss is engaged in the annular groove.

10. The toilet flange assembly as claimed in claim 8, wherein an upper surface of the sealing ring has a plurality of protruding posts, a peripheral surface of an end portion of each protruding post has a receiving groove, the flange member has mounting holes corresponding in position to the protruding posts, and a side wall of each mounting hole is engaged in the corresponding receiving groove.

11. The toilet flange assembly as claimed in claim 6, wherein the sealing ring is integrally formed with the lower surface of the flange member through a mold.

12. The toilet flange assembly as claimed in claim 6, wherein the sealing member is integrally formed with the sealing ring through a mold.

13. The toilet flange assembly as claimed in claim 5, wherein the upper ring portion has an annular flange extending radially and outwardly; an inner edge of an upper surface of the flange member is recessed to form an annular step, and the annular flange is fitted on the step.

14. The toilet flange assembly as claimed in claim 13, wherein an edge of the annular flange has a plurality of buckles; and a side wall of the step has buckle holes for the buckles to be connected with the buckle holes in a snap-fit manner.

15. The toilet flange assembly as claimed in claim 5, wherein the sealing member is integrally formed with the flange member through a mold.

16. The toilet flange assembly as claimed in claim 5, wherein the connecting ring portion has an annular curved side wall.

* * * * *